J. D. OTSTOT.
Bevel, Square, &c.
No. 105,121. Patented July 5, 1870.
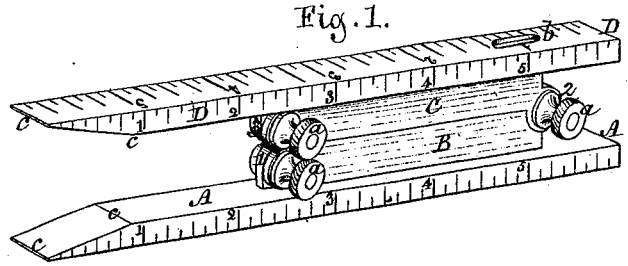
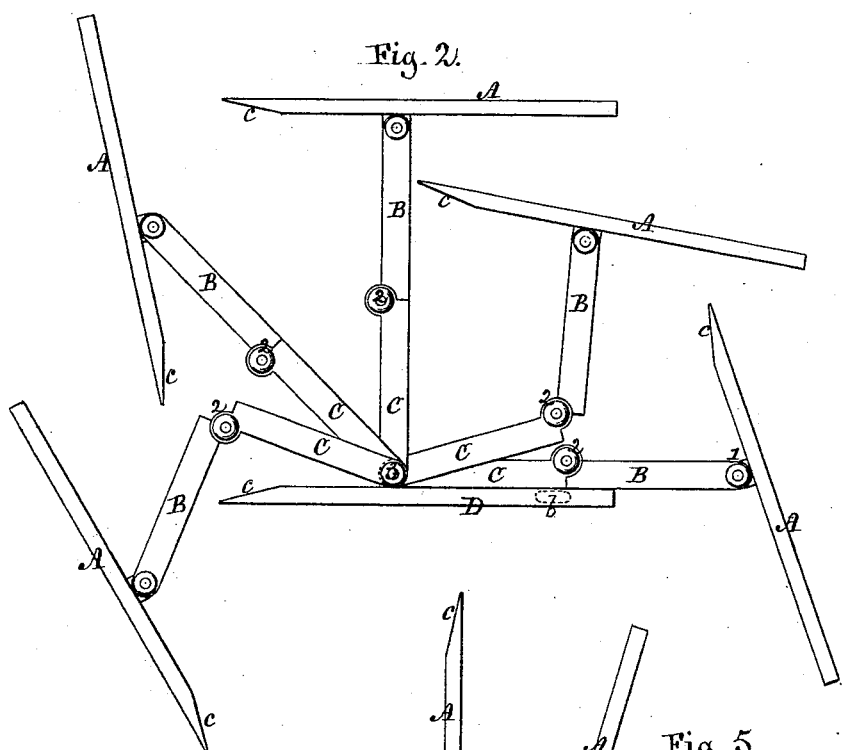
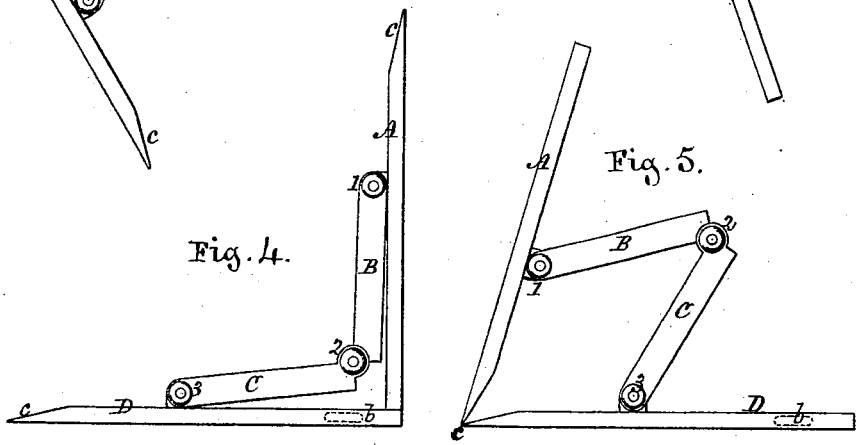
Witnesses. John D. Otstot.
By atty A. B. Stoughton.

United States Patent Office.

JOHN D. OTSTOT, OF SPRINGFIELD, OHIO.

Letters Patent No. 105,121, dated July 5, 1870.

IMPROVEMENT IN COMBINED BEVEL, SQUARE, RULE, &c.

The Schedule referred to in these Letters Patent and making part of the same

*To all whom it may concern:*

Be it known that I, JOHN D. OTSTOT, of Springfield, in the county of Clark and State of Ohio, have invented a new and useful instrument, which I term a Combined Level, Bevel, Square, and Rule; and I do hereby declare the following to be a full, clear, and exact description of the same, reference being had to the accompanying drawings making part of this specification, in which—

Figure 1 represents, in perspective, the instrument in its folded-up condition.

Figure 2 represents some of the positions into which the instrument may be put, for taking bevels, without changing one of the limbs of the instrument, as will be explained.

Figures 3, 4, and 5 represent other positions into which the instrument may be put.

Similar letters of reference where they occur in the several separate figures denote like parts of the instrument in all of the drawings.

This invention relates to a hinged or folding instrument, composed of four members or limbs, which are or may be clamp-hinged, so that when the instrument, as a whole, is set in any particular form, it may be maintained in that form or position, and moved conveniently, to transfer shapes, lines, or bevels, from one position to another, as may be required.

To enable others skilled in the art to make and use my invention, I will proceed to describe the same with reference to the drawings.

The instrument is composed of four limbs or members, A B C D, hinged together at the points 1 2 3, and each hinge controlled, or capable of being clamped, by a thumb-screw, *a*, at each.

The main limbs or members A D are marked off in inches, and subdivisions of inches, so that they may be used as a rule or measure.

The links, or uniting arms, or limbs B C, need not be subdivided.

The limb D has a bubble, *b*, set in it, so that it, individually, or in connection with its fellow A, can be used as a level in addition to their use as a rule or measuring instrument, and one of the ends each of of these two limbs B C is beveled off, as shown at *c c*, so that their points can be brought close together, as seen in fig. 5, or as seen in fig. 3, when the instrument is folded out to its greatest capacity, and the main limbs A D are on a level plane. And instead of hinging the limbs so that the points *c* shall meet, as in said fig. 3, they may be hinged so that the butts or square ends shall meet and abut against each other similar to a rule joint.

This would be the case if the hinges 1 3 were in the center of their respective limbs, which they are not in the present construction, but may be so.

The above description covers the construction of the instrument in general.

In addition to its use as a level, as shown in figs. 1 and 3, and as a square, as shown in fig. 4, and a bevel, as shown in fig. 5, its use in the latter capacity, and as seen in fig. 2, is almost unlimited.

The limb A can be put into any of the positions shown in fig. 2, and into as many or more intermediate ones without moving its fellow D from its position, as is shown in that illustration, so that a bevel or angle of almost any shape or form can be taken by the instrument.

The above-described instrument may be made entirely of metal, or part of metal and part of wood, ivory, or any other material of suitable strength and endurance for such purpose.

Having thus fully described my invention,

What I claim as new, and desire to secure by Letters Patent, is—

An instrument, in which is combined a level, bevel, rule, and square, when composed of four members, limbs, or pieces, hinged together, in the manner and for the purpose herein described and represented.

JOHN D. OTSTOT.

Witnesses:
J. H. MOWER,
AMOS BARR.